Patented May 28, 1946

2,400,959

UNITED STATES PATENT OFFICE 2,400,959

HYDROGENATION AND DEHYDROGENATION CATALYSTS

Meredith Marvin Stewart, Beacon, N. Y., assignor to Iowa State College Research Foundation, a corporation of Iowa No Drawing. Application December 18, 1940, Serial No. 370,625

2 Claims. (Cl. 260—690)

This invention relates to new and improved catalysts which may be used to hydrogenate or dehydrogenate various organic compounds. More specifically, it relates to a new copper-containing catalyst and the process for making the same.

It is known to the art that a number of substances have a tendency, under appropriate conditions, to induce the hydrogenation of various organic compounds. In some cases, these substances are elementary in form, such as nickel and platinum catalysts. In other cases, oxides and salts of elements have been found effective. Many of these catalysts consist of a mixture or chemical combination of compounds. In these cases, it is almost invariably stated that the components of the catalyst must either be coprecipitated or fused together in order to give a homogeneous product.

It is a distinct advantage of my catalyst, and of its method of preparation, that its various constituents may be prepared independently under those conditions best suited to their production, and mechanically mixed, rather than being prepared by coprecipitation or fusion.

Some of the catalysts which have been heretofore described employ metallic or combined copper as an active agent. In all of these cases, the copper, as it appears in the catalyst, is either in the reduced state, as metallic copper, or in the most highly oxidized state, as a cupric compound. In none of them does copper appear in the cuprous state. In fact, the literature states most conclusively that copper in the monovalent form is not suitable for catalytic hydrogenations and dehydrogenations.

My invention is based in part on the discovery of a form of cuprous oxide which is a very active catalytic agent. In preparing my activated cuprous oxide I use a solution of some copper salt which is quite soluble in water. Cupric sulfate and cupric nitrate are very satisfactory, although I prefer the nitrate because of its higher solubility. Halogen salts of copper tend to produce a catalyst of lower activity because traces of the halogen salt remain in the precipitate and tend to sinter under hydrogenating conditions. The concentration of the water-soluble copper salt in the solution is not critical.

To the above solution I add a weak reducing agent. Organic reducing agents, such as compounds containing the aldehyde group, are preferable. This agent should be of such strength that it will reduce cupric ion to cuprous ion but not to the elementary copper. Reducing sugars, such as glucose and dextrose, are most satisfactory. In order that all of the copper ion present in the solution be reduced to the cuprous form, it is essential that not less than an equimolar portion of reducing agent be added. A large excess is not detrimental.

To the solution thus formed, I add a solution of the hydroxide of an alkali metal or ammonium. As hereinafter used, "alkali metal" will be understood to include ammonium. Sodium hydroxide and potassium hydroxide are equally good, although I prefer the former because of its cheapness. The basicity of the solution thus formed must be rather carefully regulated. If the basicity is too high, undesirable side reactions will take place between the base and the reducing agent. If the basicity is too low, cuprous hydroxide rather than cuprous oxide will be precipitated. These limits may easily be determined by one skilled in the art. The proportion of 8% to 10% by weight of sodium hydroxide has proved very satisfactory. It is desirable to agitate the above mixture in order to break up the intermediate gel of cupric oxide which forms.

After the cupric gel has been broken up, I warm the mixture to a temperature which may vary between about 60° C. and the boiling point of the solution. The precipitation of cuprous oxide at temperatures substantially below 60° C. produces an inactive form of the substance. Although catalytic activity is still present, there is a gradual diminution of activity in catalysts precipitated at temperatures above about 85° C.

The length of time that this digestion should proceed depends on the temperature of the digestion. The lower the precipitation temperature, the longer the digestion may proceed without detrimental effect, and vice versa. It must proceed at least until all traces of the second intermediate transformation (yellowish or salmon-colored cuprous hydroxide) has disappeared. This usually takes place in about 15 minutes or less. Digestion periods up to an hour may be used although no advantage is gained by extended digestion. Periods of more than about an hour gradually decrease the catalytic activity.

The precipitate from the above reaction is collected in some suitable manner, such as centrifuging or filtering, washed and dried to a substantially anhydrous condition. The presence of any appreciable amount of water in the catalyst lowers its activity. My preferred method of drying is under vacuum at room temperature.

Somewhat higher temperatures than this may be employed, but drying at 100° C. destroys activity. Activated cuprous oxide is a dark-reddish-brown as distinguished from the red cubic crystals of cuprous oxide prepared by other methods.

Example 250 ml. of a 40% solution of NaOH were added with stirring to a solution containing 250 gm. of $Cu(NO_3)_2 \cdot 6H_2O$ and 250 gm. of dextrose in 1250 ml. of water. The mixture was warmed to about 85° C. for about 30 minutes, filtered and washed until the filtrate was clear. The precipitate was dried for 12 hours in a vacuum dessicator at room temperature. The result was a quantitative yield of dark reddish-brown activated cuprous oxide catalyst.

My activated cuprous oxide is non-hygroscopic and does not lose activity on standing. It is further distinguishable from catalytically inactive cuprous oxides in that it is easily wet by water, whereas the inactive forms are wet only with difficulty.

My activated cuprous oxide catalyst has some catalytic activity by itself, without the addition of any other materials. However, it is limited to relatively easy hydrogenations. Under severe conditions, such as the hydrogenation of aldehydes and ketones, the cuprous oxide is reduced to elementary copper and requires the protection of some other compound. For this reason, as well as to enhance catalytic activity under all circumstances, I prefer to add a promoter, such as the oxide or hydroxide of an alkaline earth metal. The oxide is preferable to the hydroxide since the presence of any water, whether it be mechanically mixed, water of crystallization, or chemically combined, is to some extent detrimental to activity. Calcium oxide made by calcining calcium hydroxide for two hours at 700° to 800° C. gives very good results.

Many hydrogenations and dehydrogenations may be accomplished with a catalyst consisting of activated cuprous oxide promoted by an alkaline earth metal oxide or hydroxide, but better results are obtained in all cases, and many more compounds may be treated if, in addition, a stabilizer is used, consisting of the oxide of an acid-forming metal. Any of these oxides is satisfactory except those known to the art as catalytic poisons, such as: arsenic, reduced sulfur, selenium, tellurium, etc. The activity and stability of the catalyst is increased by the addition of a stabilizer which is also a strong dehydrating agent, while, conversely, the selectivity is increased by a stabilizer which is not. I have found the oxides of chromium, vanadium and aluminum to be best adapted to stabilizing my activated cuprous oxide.

The method of preparation appears to have a marked effect on the utility of chromium oxide as a stabilizer. $Cr_2O_3$ prepared by igniting $Cr(NO_3)_2$ at a heat of 350° to 400° C. is much inferior to that precipitated from a solution of $Cr(NO_3)_2$ by the addition of concentrated $NH_4OH$, washed and dried.

Any of the five known vanadium oxides may be used as stabilizers, however, it appears that under hydrogenating conditions the monoxide and the dioxide are oxidized to the trioxide and that the pentoxide is reduced to the tetroxide. The tetroxide prepared by reducing the pentoxide with glucose, washing and drying, has proved excellent.

The preferred form of aluminum oxide is that partially hydrated oxide known as "activated alumina." It is an exceptionally mild and selective stabilizer. My activated cuprous oxide catalyst, when stabilized with Activated Alumina, will hydrogenate furfural to furfuryl alcohol quantitatively without any tarring and without carrying the hydrogenation to tetrahydrofurfuryl alcohol.

The proportions of the constituents to be used in making up the catalyst, and the amount of catalyst to be employed in catalyzing the reaction of a given bulk of organic compound, are not critical. For the best results, the amount of promoter added should be between 12% and 60% of the amount of activated cuprous oxide. Lower proportions gradually lower the efficiency of the catalyst and higher proportions do not benefit the hydrogenation in any way. The amount of stabilizer may vary over a wide range. The optimum amount for any given organic compound can very easily be determined by observation.

The speed at which hydrogenations and dehydrogenations take place is in more or less direct relation to the amount of catalyst used. I have found that 3% to 5% of the amount of organic compound treated gives rapid and satisfactory results. Because of the small amounts of poisons which are apt to be present and which will deactivate a portion of the catalyst, concentrations of less than 1% generally act very slowly.

Threshold and optimum temperatures and pressures are functions of the organic compound treated and may easily be determined by an experimental hydrogenation. The pressures usually come within a range of from 10 atmospheres to 400 atmospheres.

I prefer to use my catalyst for liquid phase processes of hydrogenation and dehydrogenation. The relatively severe conditions under which vapor phase operations take place often tend to reduce the cuprous oxide to elementary copper and thereby destroy its activity.

My catalyst is especially adapted to the hydrogenation of organic compounds such as the carbonyl compounds and to the dehydrogenation of the carbonyl compounds and of alcohols to aldehydes. When stabilized with vanadium, it will dehydrogenate methyl alcohol to formaldehyde.

As used herein and in the appended claims, the phrase "changing the hydrogen content" of a compound is intended to embrace both the hydrogenation and dehydrogenation of such compound.

The following are specific examples of the manner in which I use my invention:

Example I 5.8 gm. of activated $Cu_2O$, 2.8 gm. of freshly calcined CaO, and 250 ml. of furfural were placed in a gas-tight rocking chamber. After the air was swept out, the hydrogen pressure in the chamber was raised to about 600 lb./sq. in., the temperature raised to about 155° C., and the chamber set in motion. At the end of 37 min., three-fourths of the theoretical amount of hydrogen necessary to convert the furfural into furfuryl alcohol had been absorbed. When the chamber cooled, it was found to contain a practically quantitative amount of furfuryl alcohol.

Example II 5.8 gm. of activated cuprous oxide, 2.8 gm. of freshly calcined CaO, 2.8 gm. of active $CR_2O_3$, and 250 ml. of furfural were treated in substantially the above manner. In 31 min. three-fourths of the theoretical amount of hydrogen had been absorbed. The yield was a practically quantitative amount of furfuryl alcohol.

Example III 5.8 gm. of activated cuprous oxide, 2.8 gm. of freshly calcined CaO, 2.8 gm. of $V_2O_4$, and 250 ml. of acetophenone were placed in the rocking chamber. The hydrogen pressure was raised to 580 lb./sq. in., the temperature to about 118° C. and the chamber set in motion. Three-fourths of the theoretical amount of hydrogen was consumed in 43 min. The yield was a practically quantitative amount of phenyl methyl carbinol.

Example IV 5.8 gm. of activated cuprous oxide, 2.8 gm. of freshly calcined CaO, 2.8 gm. of Activated Alumina, and 250 ml. of water-white furfural were treated substantially as in Example I. In 45 min. three-fourths of the theoretical amount of hydrogen had been absorbed. The yield was a practically quantitative amount of water-white furfuryl alcohol, without any trace of tarring or discoloration.

I claim:

1. A process for changing the hydrogen content of organic compounds which comprises subjecting such compounds to hydrogen at a pressure between 10 atmospheres and 400 atmospheres at a temperature between 100° C. and 300° C. in the presence of a catalyst containing a major proportion of activated cuprous oxide characterized by the quality of being easily wet by water, a small quantity of a promoter consisting of a compound selected from the group consisting of alkaline earth metal oxides and alkaline earth metal hydroxides and a small quantity of a stabilizing agent consisting of vanadium oxide.

2. A catalyst capable of improving the efficiency of liquid phase reactions for changing the hydrogen content of carbonyl compounds, consisting essentially of an intimate mixture of a major proportion of activated cuprous oxide characterized by the quality of being easily wet by water, a small quantity of a promoter consisting of a compound selected from the group consisting of alkaline earth metal oxides and alkaline earth metal hydroxides and a small quantity of a stabilizing agent consisting of vanadium oxide.

MEREDITH MARVIN STEWART.